United States Patent
Busari et al.

(10) Patent No.: US 11,115,323 B2
(45) Date of Patent: Sep. 7, 2021

(54) SECURING LAYER-3 VIRTUAL PRIVATE NETWORK

(71) Applicant: Saudi Arabian Oil Company, Dhahran (SA)

(72) Inventors: Mudashiru Busari, Dhahran (SA); Salah M. S. Buraiky, Dhahran (SA); Muhammad I. Khayyal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 95 days.

(21) Appl. No.: 15/591,354

(22) Filed: May 10, 2017

(65) Prior Publication Data

US 2018/0331949 A1 Nov. 15, 2018

(51) Int. Cl.
| | |
|---|---|
| H04L 12/46 | (2006.01) |
| H04L 12/723 | (2013.01) |
| H04L 12/761 | (2013.01) |
| H04L 12/713 | (2013.01) |
| H04L 12/775 | (2013.01) |
| H04L 12/715 | (2013.01) |
| H04L 12/741 | (2013.01) |

(52) U.S. Cl.
CPC .......... *H04L 45/50* (2013.01); *H04L 12/4641* (2013.01); *H04L 45/04* (2013.01); *H04L 45/16* (2013.01); *H04L 45/54* (2013.01); *H04L 45/583* (2013.01); *H04L 45/586* (2013.01)

(58) Field of Classification Search
CPC ...... H04L 12/4641; H04L 45/16; H04L 45/50
See application file for complete search history.

(56) References Cited

U.S. PATENT DOCUMENTS

| | | | |
|---|---|---|---|
| 6,339,595 B1 * | 1/2002 | Rekhter | H04L 12/4645 370/392 |
| 7,075,933 B2 | 7/2006 | Aysan | |
| 7,116,665 B2 * | 10/2006 | Balay | H04L 45/00 370/392 |
| 7,274,704 B1 * | 9/2007 | Ould-Brahim | H04L 12/4641 370/254 |
| 7,318,108 B2 * | 1/2008 | Sreekantiah | H04L 45/02 709/238 |
| 7,400,611 B2 * | 7/2008 | Mukherjee | H04L 12/4641 370/338 |

(Continued)

FOREIGN PATENT DOCUMENTS

| | | |
|---|---|---|
| EP | 1768335 | 3/2007 |
| EP | 1856849 B1 | 6/2012 |

OTHER PUBLICATIONS

Rosen and Rekhter, "BGP/MPLS IP Virtual Private Networks (VPNs)—RFC 4364," IETF Standards, The Internet Society, Feb. 2006, 47 pages.

(Continued)

*Primary Examiner* — Huy D Vu
*Assistant Examiner* — Bailor C. Hsu
(74) *Attorney, Agent, or Firm* — Fish & Richardson P.C.

(57) ABSTRACT

A data packet from a sub-virtual routing and forwarding (sub-VRF) in a virtual routing and forwarding (VRF) is received. The VRF includes more than one sub-VRF. A value in a Border Gateway Protocol (BGP) attribute attached to the data packet is determined. Based on the value in the BGP attribute, whether to route the data packet to a different sub-VRF in the VRF is determined.

17 Claims, 3 Drawing Sheets

(56) References Cited

U.S. PATENT DOCUMENTS

| | | | |
|---|---|---|---|
| 7,486,659 B1 * | 2/2009 | Unbehagen | H04L 12/4633 370/351 |
| 7,688,829 B2 * | 3/2010 | Guichard | H04L 12/4641 370/395.31 |
| 7,747,954 B2 * | 6/2010 | Farid | H04L 12/4641 709/224 |
| 7,756,998 B2 * | 7/2010 | Pirbhai | H04L 45/54 709/230 |
| 7,852,772 B2 * | 12/2010 | Filsfils | H04L 45/00 370/238 |
| 7,865,615 B2 * | 1/2011 | Mirtorabi | H04L 45/04 709/242 |
| 7,894,430 B2 | 2/2011 | Maalouf et al. | |
| 7,907,595 B2 * | 3/2011 | Khanna | H04L 12/4641 370/351 |
| 7,912,936 B2 | 3/2011 | Rajagopalan | |
| 8,027,347 B2 * | 9/2011 | Ould-Brahim | H04L 12/4625 370/397 |
| 8,144,624 B2 | 3/2012 | Natarajan et al. | |
| 8,320,279 B2 | 11/2012 | Sarkar et al. | |
| 8,488,491 B2 * | 7/2013 | Moreno | H04L 45/64 370/254 |
| 8,528,070 B2 * | 9/2013 | Stiekes | H04L 63/1441 726/11 |
| 8,619,791 B2 | 12/2013 | Ould-Brahim | |
| 8,656,050 B2 | 2/2014 | Chu et al. | |
| 8,675,656 B2 | 3/2014 | Guichard et al. | |
| 8,774,047 B2 * | 7/2014 | Kulmala | H04L 12/4641 370/254 |
| 8,929,367 B2 | 1/2015 | Satterlee et al. | |
| 8,953,590 B1 * | 2/2015 | Aggarwal | H04L 45/74 370/389 |
| 8,995,446 B2 * | 3/2015 | Patel | H04L 12/4641 370/395.53 |
| 9,106,530 B1 * | 8/2015 | Wang | H04L 41/12 |
| 9,596,167 B1 * | 3/2017 | Jacob | H04L 12/4641 |
| 9,692,692 B1 * | 6/2017 | Vairavakkalai | H04L 45/025 |
| 9,825,778 B2 * | 11/2017 | Guichard | H04L 63/0272 |
| 2004/0025054 A1 | 2/2004 | Xue | |
| 2007/0133577 A1 * | 6/2007 | Dong | H04L 12/4641 370/401 |
| 2007/0250612 A1 * | 10/2007 | Elias | H04L 45/04 709/223 |
| 2010/0329252 A1 | 12/2010 | Mulamalla et al. | |
| 2014/0029419 A1 * | 1/2014 | Jain | H04L 41/0659 370/228 |
| 2016/0050147 A1 * | 2/2016 | Zhang | H04L 45/02 370/392 |
| 2017/0289216 A1 * | 10/2017 | N | H04L 45/22 |
| 2018/0270161 A1 * | 9/2018 | Popescu | H04L 47/283 |

OTHER PUBLICATIONS

Sangli et al., "BGP Extended Communities Attribute—RFC 4360," IETF Standards, The Internet Society, Feb. 2006, 12 pages.
Bates et al., "Multiprotocol Extensions for BGP-4—RFC 4760," IETF Standards, The IETF Trust, Jan. 2007, 12 pages.
Jeng, "Virtual Hub-and-Spoke in BGP/MPLS VPNs—RFC 7024," IETF Standards, Oct. 2013, 25 pages.
Clercq et al., "BGP/IPSEC VPN," Internet Engineering Task Force (IEFTF), Jul. 2000, 27 pages.
International Search Report and Written Opinion issued in International Application No. PCT/US2018/030202 dated Jul. 17, 2018, 18 pages.
GCC Examination Report in GCC Appln. No. GC 2018-35253, dated Apr. 6, 2020, 5 pages.
GCC Examination Report in GCC Appln. No. GC 2018-35253, dated May 3, 2021, 4 pages.

* cited by examiner

SECURING LAYER-3 VIRTUAL PRIVATE NETWORK

TECHNICAL FIELD

This disclosure relates to improving the security of a Layer-3 Virtual Private Network (L3VPN).

BACKGROUND

In some implementations, Telecom service providers and big enterprises use Multi-Protocol Label Switching (MPLS) technology to provide Internet Protocol (IP) transport. MPLS is a type of data-carrying technique for telecommunications networks that directs data from one network node to another network node based on short path labels instead of long network addresses. The short path labels identify virtual links (paths) between distant nodes, rather than endpoints.

SUMMARY

The present disclosure describes methods and systems, including computer-implemented methods, computer program products, and computer systems for improving the security of a Layer-3 Virtual Private Network (L3VPN).

In an implementation, a computer-implemented method includes receiving, a data packet from a sub-virtual routing and forwarding (sub-VRF) in a virtual routing and forwarding (VRF), wherein the VRF includes more than one sub-VRF; determining, a value in a Border Gateway Protocol (BGP) attribute attached to the data packet; and determining, based on the value in the BGP attribute, whether to route the data packet to a different sub-VRF in the VRF.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, by dividing a VRF into sub-VRFs, different BGP attribute values can be assigned to each sub-VRF. Second, different BGP attribute values can be used to identify whether a data packet is a unicast packet or a multicast packet. Therefore, import and export policies can be configured and enforced to implement intra-VRF restrictions on unicast data between specific user groups without impeding multicast traffic or traffic for resources and special users. Third, import and export policies can be modified in the event of a virus outbreak or security breach to isolate a particular user group. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes securing a Layer-3 Virtual Private Network (L3VPN) and is presented to enable any person skilled in the art to make and use the disclosed subject matter in the context of one or more particular implementations>, and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

Multi-Protocol Label Switching (MPLS) can encapsulate packets of various network protocols, and therefore can transport different types of protocols and services for different types of customers on a single converged IP-based infrastructure. In some implementations, a telecom service provider or a big enterprise can use MPLS to host multiple Virtual Private Networks (VPNs), for example, L3VPNs, on a single IP backbone infrastructure while providing logical segregation between these VPNs. An L3VPN, also known as virtual private routed network (VPRN), uses layer 3 VPN or a virtual routing and forwarding (VRF) to segment routing tables for each customer utilizing the service. In the L3VPN, Multiprotocol Border Gateway Protocol (M-BGP) is used to carry routing information for the data packets.

In some implementations, data traffic between VPNs on a MPLS network may be segregated. The inter-VPN data traffic may be filtered at a firewall, and security policies may be enforced to block this data traffic. However, the intra-VPN data traffic, representing data traffic among users within a VPN, may be transported without a security enforcement. In some cases, an enterprise VPN may include thousands of users that are distributed in wide geographic areas. In these cases, there may be security risks associated with data traffic within a VPN. For example, a virus outbreak or a network attack may spread from one computing device to another across the VPN.

Figure 1:
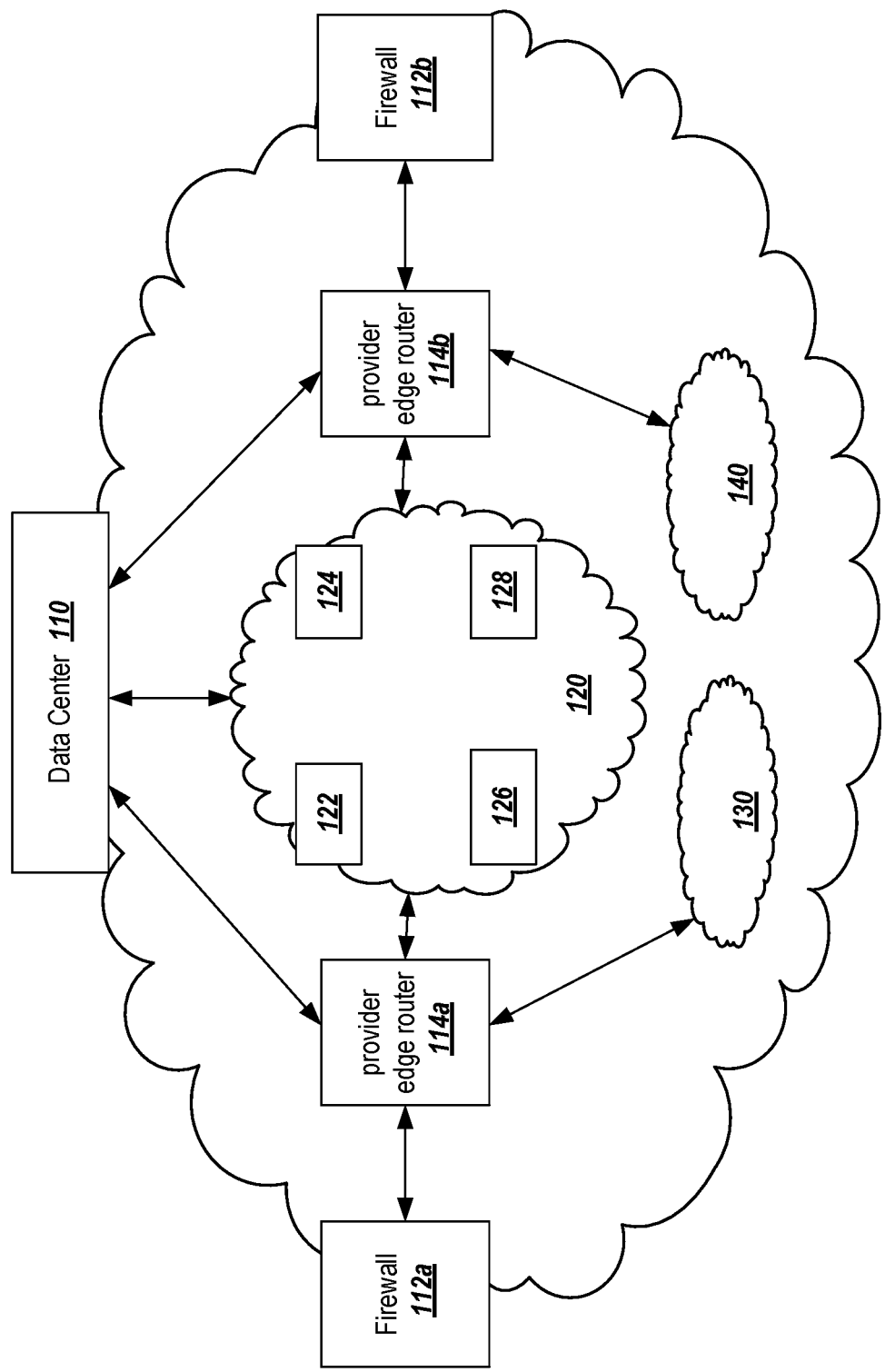
FIG. 1 is a high level schematic diagram illustrating a Multi-Protocol Label Switching (MPLS) network, according to an implementation.
Figure 2:
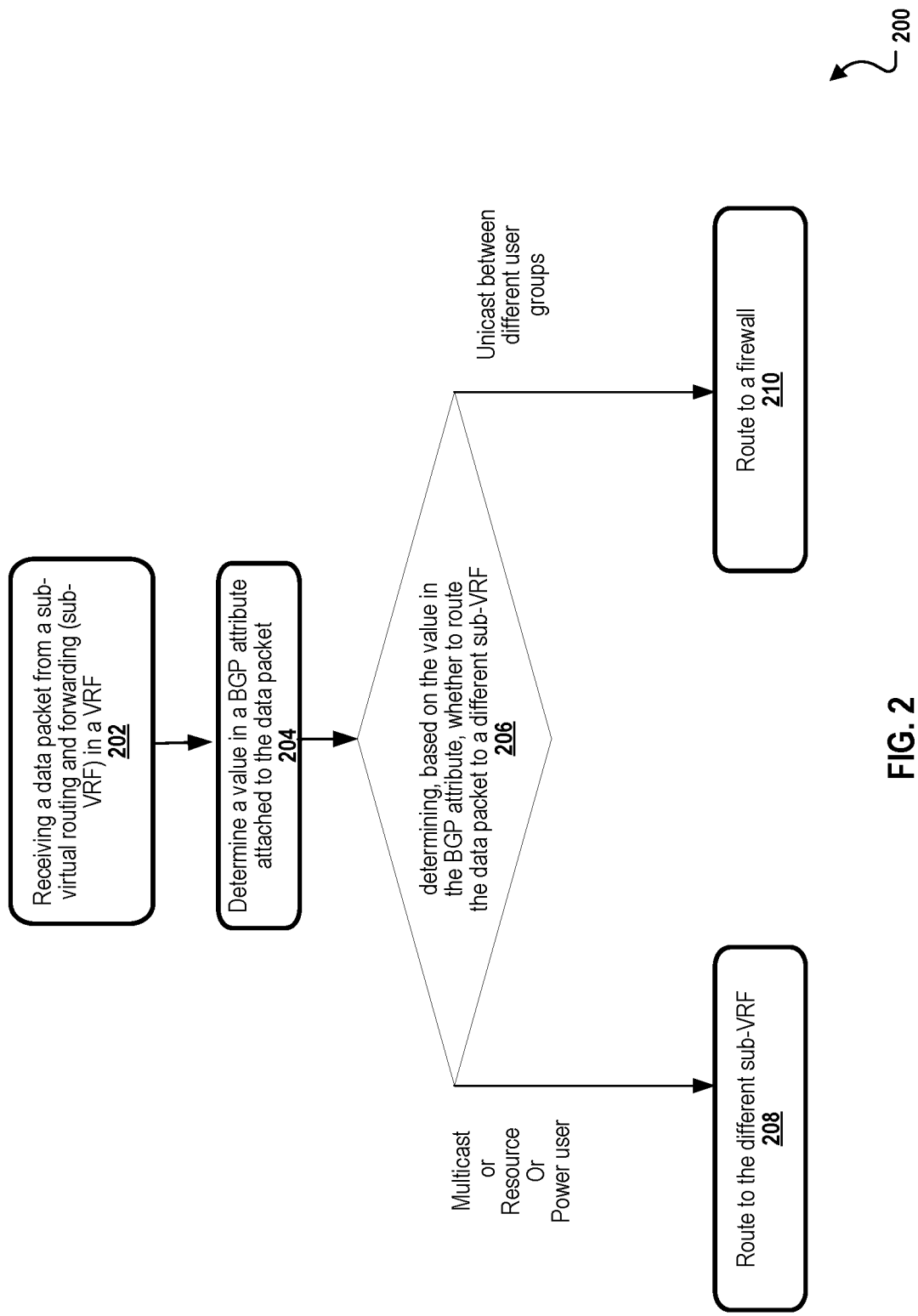
FIG. 2 is a flowchart illustrating an example process for securing a Layer-3 Virtual Private Network (L3VPN), according to an implementation.
Figure 3:
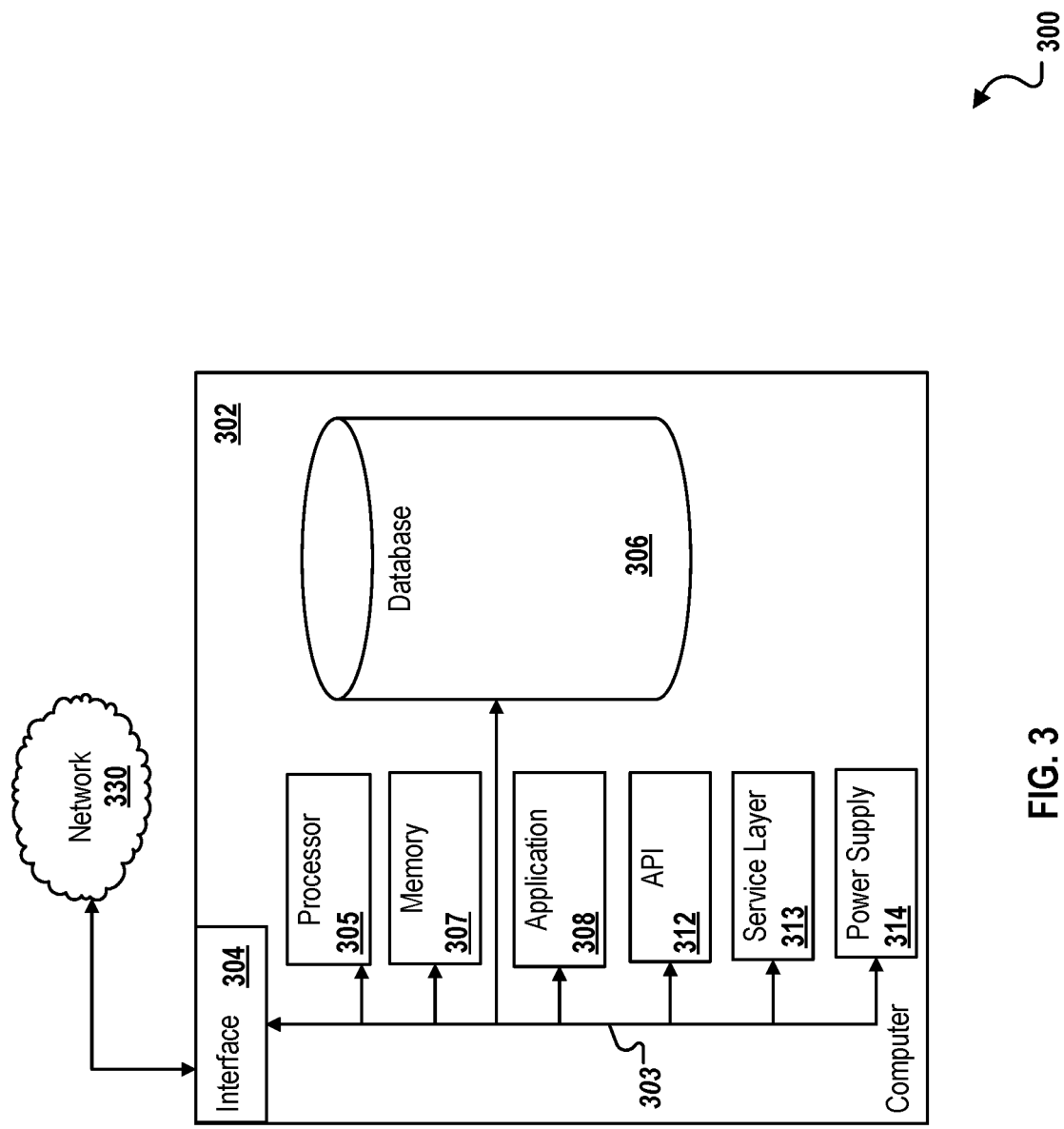
FIG. 3 is a block diagram of an example computer system used to provide computational functionalities associated with described algorithms, methods, functions, processes, flows, and procedures as described in the instant disclosure, according to an implementation.

In some cases, a VRF that represents a L3VPN, can be divided into sub-VRFs. Different M-BGP attribute values can be assigned to each sub-VRF. These different M-BGP attribute values can be used to identify whether a data packet is a unicast packet or a multicast packet and the originating sub-VRF. Import and export policies can be configured and enforced to implement intra-VRF restrictions on unicast data between specific user groups without impeding multicast traffic or traffic for resources and special users. In addition, import and export policies can be modified in the event of a virus outbreak or security breach to isolate a particular user group. Other advantages will be apparent to those of ordinary skill in the art. FIGS. 1-3 and associated descriptions provide additional details of these implementations.

FIG. 1 is a high level schematic diagram illustrating an MPLS network 100, according to an implementation. The network 100 includes a data center 110, firewalls 112*a-b*, provider edge routers 114*a-b*, and VRFs 120, 130, and 140.

The data center 110 represents an application, set of applications, software, software modules, hardware, or combination of software and hardware that provides resources to users in the network 100. For example, the data center 110 can provide access to computing processing power, memory storage space, stored data, software applications, cloud services, and any other resources such as Active Directory Domain Controllers, Domain Name Service (DNS), Dynamic Host Configuration Protocol (DHCP), Network Time Protocol (NTP), and the like. As illustrated, the data center 110 can be accessed directly by users in the VRF 120, or by users in the VRFs 130 or 140 through provider edge routers 114*a-b*.

The network 100 includes the provider edge routers 114*a-b*. While two provider edge routers are illustrated, the network 100 can include more or less provider edge routers. A provider edge router is a router located at the boundary of a network that routes data traffic for the network 100. As will be discussed in more detail, import and export policies for data traffic within a VRF can be configured at the provider edge routers 114*a-b*. The provider edge routers can enforce these polices. For example, the provider edge routers 114*a-b* can examine BGP attributes attached to an IP packet received from users in a sub-VRF, and determine whether the packet is a unicast or a multicast packet, and the originating sub-VRF of the packet. Based on the import/export policy and the BGP attribute, the provider edge routers 114*a-b* can determine whether to route the packet to a user in a different sub-VRF, or to route the data traffic to the firewalls 112*a-b*. Moreover, the import and export polices configured at the provider edge routers 114-*b* can be modified to isolate a particular sub-VRF.

The network 100 also includes the firewalls 112*a-b*. While two firewalls are illustrated, the network 100 can include more or fewer firewalls. The firewalls 112*a-b* are firewalls that monitor and control the incoming and outgoing network traffic of the network 100 based on security rules. The firewalls 112*a-b* can establish a barrier between the network 100 and devices outside of the network 100, and block certain types of data traffic from entering the network 100. The firewalls 112*a-b* can be configured to block traffic between sub-VRFs, based on security policies.

In addition to enforcing intra-VRF policies and blocking certain types of intra-VRF traffic, the provider edge routers 114*a-b* and the firewalls 112*a-b* can also be configured to enforce polices and block traffic between VRFs. For example, the provider edge routers 114*a-b* can be configured to route all traffic between VRFs to the firewalls 112*a-b*. The firewalls 112*a-b* can determine whether certain types of inter-VRF traffic are blocked, based on security policies.

In the illustrated example, provider edge router 114*a* corresponds to firewall 112*a* and routes data traffic to firewall 112*a*, while provider edge router 114*b* corresponds to firewall 112*b* and routes data traffic to firewall 112*b*. In some implementations, one provider edge router can correspond to multiple firewalls. Similarly, one firewall can correspond to multiple provider edge routers.

The network 100 includes VRF 120. The VRF 120 represents a L3VPN instance served by the network 100. In one example, the VRF 120 provides VPN services for the intranet users of an enterprise. The users of the VRF 120 include computing devices that are located on the premises of the enterprise. The users of the VRF 120 may also include computing devices operated by employees of the enterprise who receive intranet access on the network 100 by verifying their credentials such as login usernames and passwords. In some cases, the users of the VRF 120 may include thousands of computing devices that are geographically scattered across different continents.

As illustrated, the VRF 120 is divided into sub-VRFs 122, 124, 126, and 128. The sub-VRF 122 includes resources that are can be accessed by any users in the VRF 120, for example, the users in sub-VRFs 124, 126, and 128. Examples of these resources include Domain Name Service (DNS) or other services such as regional Active Directory Domain Controllers, DHCP, NTP, or components of enterprise services distributed throughout the VRF 120 outside of the data center 110. In some cases, these resources in the sub-VRF 122 can be located in different geographic locations.

The sub-VRF 124 includes power users that are authorized to access any other users in the VRF 120. For example, the sub-VRF 124 can include computing devices operated by the Information Technology (IT) specialist of the enterprise.

Each of the sub-VRFs 126 and 128 represents a regular user group. Although only two regular user groups are illustrated, the VRF 120 can include additional regular user groups (sub-VRFs). Regular user groups can be divided based on one or more criteria. Examples of these criteria include geographic location, job function, common resources accessed in the network, and organization structure. In one example, regular user groups can be divided based on geographic locations. The users located in one geographic area can be grouped into one regular user group and served by one sub-VRF, while users located in another geographic area can be grouped into a different regular user group and served by a different sub-VRF. In another example, regular user groups can be divided based on the job functions of the employees. Computing devices operated by researchers can be grouped in one regular user group and computing devices operated by salespeople can be grouped into a different regular user group. In yet another example, regular user groups can be divided based on the organizational structure of the employees. Computing devices operated by employees in one department can be grouped in one regular user group and computing devices operated by employees in a different department can be grouped into a different regular user group. In some cases, regular user groups can be divided based on more than one criteria. For example, computing devices operated by researchers located in one area can be grouped into a regular user group. The sub-VRF partition can be configured by a network administrator of the network 100 or any other person or entity that manages the operations of the network 100.

In the network 100, a set of BGP Extended Community attributes are defined to control the data transports for users in different sub-VRFs. BGP Extended Communities Attribute is an optional transitive attribute defined in the M-BGP protocol. BGP Extended Communities Attribute can carry multiple Extended Community values. In same cases, each Extended Community value is eight octets in length.

For unicast traffic originated from data center 110 and each of the sub-VRFs in the VRF 120, a BGP Extended Community attribute is defined in the format: target:Value1:Value2. Value1 is a unique number that identifies the network 100. Value1 can be an Autonous System number. Value1 can be a private or public number assigned by Internet Assigned Numbers Authority (IANA). Value2 for the data center 110 and for each of the sub-VRFs are different and therefore can be used to identify the originator of the unicast traffic. For example, Value2 for the data center 110 can be set to the value A; Value2 for the sub-VRF 122 can be set to the value B; Value2 for the sub-VRF 124 can be set to the value C; Value2 for the sub-VRF 126 can be set to the value D; Value2 for the sub-VRF 128 can be set to the value E.

For the multicast traffic in the VRF 120, another BGP Extended Community attribute is defined in the format: target:Value1:Value2. Value1 can be set to be the same as Value1 for the unicast traffic discussed previously, while Value2 is set to be different than any Value2 of the unicast traffic discussed previously. For example, Value2 for multicast traffic can be set to the value F. Accordingly, any multicast traffic source within the VRF 120 attaches the multicast traffic with the BGP attribute having Value2 set to be value F. In some implementations, the values of these attributes can be defined by a network administrator, and configured at the provider edge routers 114*a-b*.

Using these BGP attributes, import and export polices can be enforced to restrict the inter sub-VRF traffic. The import and export policies can be configured by a network administrator of the network 100, or any other person or device that manages the operations of the network 100. The following is an example list of import and export polices that can be configured at the provider edge routers 114*a-b* to restrict the inter sub-VRF traffic:

1) Routes originated from the data center 110 or each of the sub-VRFs are exported to the MPLS backbone by attaching the BGP attribute identifying the originator of the unicast traffic discussed previously. In some cases, the BGP attribute can be attached by the the provider edge routers 114*a-b*. For example, the attribute target:Value1:D is attached to routes originated from sub-VRF 126, 2) The data center 110 can import routes from any of the sub-VRFs in the VRF 120, 3) The sub-VRF 122 that includes resources for the users in the VRF 120 can import all routes from the data center 110 and any of the other sub-VRFs in the VRF 120, 4) The sub-VRF 124 that includes the power users can import all routes from the data center 110 and any of the other sub-VRFs in the VRF 120, 5) Each of the sub-VRFs 126 and 128, including users in an individual regular user group, can only import routes from the data center 110, the sub-VRF 122, and the sub-VRF 124, and 6) The data center 110 and all the sub-VRFs can import and export multicast routes.

Because each route is attached with the BGP attribute, the previously described policies can be enforced by examining the values in the BGP attribute to identify the originator of the traffic in the route and whether the traffic is unicast or multicast. Therefore, unicast traffic between user groups can be restricted without impeding multicast traffic.

In some implementations, based on these policies, the traffic between the users in different regular user groups, for example, the sub-VRF 126 and the sub-VRF 128, can be routed to the firewalls 112*a-b*. The firewalls 112*a-b* can determine whether this traffic is allowed. In some cases, a default route can be advertised into each regular user group sub-VRFs to route unknown traffic to one or more specific firewalls in firewalls 112*a-b*.

In some cases, the provider edge routers 114*a-b* can be configured to enforce control and containment strategies. For example, if there is a virus outbreak or a network attack from one particular regular user group sub-VRF, the import and export policies can be modified to isolate the particular regular user group sub-VRF. For example1=:

A) Stop importing routes originated from the particular regular user group sub-VRF, and B) Modify the export policy to stop advertising the default route into the particular regular user group sub-VRF, and thus stop the unknown traffic from being directed to the firewalls 112*a-b*.

The network 100 also includes VRFs 130 and 140. VRFs 130 and 140 are other L3VPN instances serviced by the network 100. The network 100 can include additional VRFs. Similar to VRF 120, the VRFs 130 or 140 can also be fragmented into multiple sub-VRFs to enforce intra-VRF unicast traffic restrictions.

In operation, the provider edge routers 114*a-b* receive data packets from a sub-VRF in a VRF, examine the BGP attribute attached to the data packet, and determine whether to route the data packet to a user in another sub-VRF in the VRF based on the BGP attribute and the import and export policy.

FIG. 2 is a flowchart illustrating an example process 200 for securing a L3VPN, according to an implementation. For clarity of presentation, the description that follows generally describes the process 200 in the context of the other figures in this description. However, it will be understood that the process 200 may be performed, for example, by any suitable system, environment, software, and hardware, or a combination of systems, environments, software, and hardware, as appropriate. In some implementations, various steps of the process 200 can be run in parallel, in combination, in loops, or in any order.

At 202, a data packet is received from a sub-virtual routing and forwarding (sub-VRF) in a VRF. From 202, the process 200 proceeds to 204. At 204, a value in a Border Gateway Protocol (BGP) attribute attached to the data packet is determined. In some cases, the BGP attribute is a BGP Extended Community attribute. From 204, the process 200 proceeds to 206.

At 206, whether to route the data packet to a different sub-VRF is determined based on the value in the BGP attribute. In some cases, whether to route the data packet to the different sub-VRF is further based on import and export polices configured at the provider edge router.

If it is determined, based on the value in the BGP attribute, that the data packet is a multicast packet, a unicast packet originated in a sub-VRF representing resources in the VRF, or a unicast packet originated in a sub-VRF representing a power user group that has access to all other sub-VRFs in the VRF, the process 200 proceeds from 206 to 208, where the provider edge routers route the data packet to the different sub-VRF.

If it is determined, based on the value in the BGP attribute, that the data packet is a unicast packet between different regular user groups, the process 200 proceeds from 206 to 210, where the provider edge routers route the data packet to a firewall.

FIG. 3 is a block diagram of an example computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical user interface (GUI).

The computer 302 can serve in a role as a client, network component, a server, a database or other persistency, or any other component (or a combination of roles) of a computer system for performing the subject matter described in the instant disclosure. For example, the computer 302 can serve as a provider edge router, a firewall, a data center, or another computing device in a MPLS network.

The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302.

The computer 302 also includes a memory 307 that can hold data for the computer 302 or other components (or a combination of both) that can be connected to the network 330 (whether illustrated or not). For example, memory 307 can be random access memory (RAM), read-only memory (ROM), optical, magnetic, and the like storing data consistent with this disclosure. In some implementations, memory 307 can be a combination of two or more different types of memory (for example, a combination of RAM and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, applications, etc. Further, although illustrated as a single application 308, the application 308 may be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or other power management functionality). In some implementations, the power-supply 314 can include a power plug to allow the computer 302 to be plugged into a wall socket or other power source to power the computer 302, recharge a rechargeable battery, etc.

There may be any number of computers 302 associated with, or external to, a computer system containing computer 302, each computer 302 communicating over network 330. Further, the term "client," "user," and other appropriate terminology may be used interchangeably, as appropriate, without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a computer-implemented method comprising: receiving, a data packet from a sub-virtual routing and forwarding (sub-VRF) in a virtual routing and forwarding (VRF), wherein the VRF includes more than one sub-VRF; determining, a value in a Border Gateway Protocol (BGP) attribute attached to the data packet; and determining, based on the value in the BGP attribute, whether to route the data packet to a different sub-VRF in the VRF.

The foregoing and other described implementations can each, optionally, include one or more of the following features:

A first feature, combinable with any of the following features, wherein the BGP attribute is a BGP Extended Community attribute.

A second feature, combinable with any of the previous or following features, wherein whether to route the data packet to a different sub-VRF in the VRF is further determined based on an import and export policy associated with the VRF.

A third feature, combinable with any of the previous or following features, the method further comprising: in response to determining that the value in the BGP attribute identifies that the data packet is a multicast data packet, routing the data packet to the different sub-VRF in the VRF.

A fourth feature, combinable with any of the previous or following features, the method further comprising: in response to determining that the value in the BGP attribute identifies that the data packet is originated in a sub-VRF representing resources in the VRF, routing the data packet to the different sub-VRF in the VRF.

A fifth feature, combinable with any of the previous or following features, the method further comprising: in response to determining that the value in the BGP attribute identifies that the data packet is originated in a sub-VRF representing users that have access to other sub-VRFs in the VRF, routing the data packet to the different sub-VRF in the VRF.

A sixth feature, combinable with any of the previous or following features, the method further comprising: in response to determining that the value in the BGP attribute identifies that the data packet is originated in a sub-VRF representing a user group, routing the data packet to a firewall.

In a second implementation, an edge router comprising: at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising: receiving, a data packet from a sub-virtual routing and forwarding (sub-VRF) in a virtual routing and forwarding (VRF), wherein the VRF includes more than one sub-VRF; determining, a value in a Border Gateway Protocol (BGP) attribute attached to the data packet; and determining, based on the value in the BGP attribute, whether to route the data packet to a different sub-VRF in the VRF.

The foregoing and other described implementations can each, optionally, include one or more of the following features:

A first feature, combinable with any of the following features, wherein the BGP attribute is a BGP Extended Community attribute.

A second feature, combinable with any of the previous or following features, wherein whether to route the data packet to a different sub-VRF in the VRF is further determined based on an import and export policy associated with the VRF.

A third feature, combinable with any of the previous or following features, the operations further comprising: in response to determining that the value in the BGP attribute identifies that the data packet is a multicast data packet, routing the data packet to the different sub-VRF in the VRF.

A fourth feature, combinable with any of the previous or following features, the operations further comprising: in response to determining that the value in the BGP attribute identifies that the data packet is originated in a sub-VRF representing resources in the VRF, routing the data packet to the different sub-VRF in the VRF.

A fifth feature, combinable with any of the previous or following features, the operations further comprising: in response to determining that the value in the BGP attribute identifies that the data packet is originated in a sub-VRF representing users that have access to other sub-VRFs in the VRF, routing the data packet to the different sub-VRF in the VRF.

A sixth feature, combinable with any of the previous or following features, the operations further comprising: in response to determining that the value in the BGP attribute identifies that the data packet is originated in a sub-VRF representing a user group, routing the data packet to a firewall.

In a third implementation, a non-transitory computer-readable medium storing instructions which, when executed, cause a computing device to perform operations comprising: receiving, a data packet from a sub-virtual routing and forwarding (sub-VRF) in a virtual routing and forwarding (VRF), wherein the VRF includes more than one sub-VRF; determining, a value in a Border Gateway Protocol (BGP) attribute attached to the data packet; and determining, based on the value in the BGP attribute, whether to route the data packet to a different sub-VRF in the VRF.

The foregoing and other described implementations can each, optionally, include one or more of the following features:

A first feature, combinable with any of the following features, wherein the BGP attribute is a BGP Extended Community attribute.

A second feature, combinable with any of the previous or following features, wherein whether to route the data packet to a different sub-VRF in the VRF is further determined based on an import and export policy associated with the VRF.

A third feature, combinable with any of the previous or following features, the operations further comprising: in response to determining that the value in the BGP attribute identifies that the data packet is a multicast data packet, routing the data packet to the different sub-VRF in the VRF.

A fourth feature, combinable with any of the previous or following features, the operations further comprising: in response to determining that the value in the BGP attribute identifies that the data packet is originated in a sub-VRF representing resources in the VRF, routing the data packet to the different sub-VRF in the VRF.

A fifth feature, combinable with any of the previous or following features, the operations further comprising: in response to determining that the value in the BGP attribute identifies that the data packet is originated in a sub-VRF representing users that have access to other sub-VRFs in the VRF, routing the data packet to the different sub-VRF in the VRF.

A sixth feature, combinable with any of the previous or following features, the operations further comprising: in response to determining that the value in the BGP attribute identifies that the data packet is originated in a sub-VRF representing a user group, routing the data packet to a firewall.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method performed by an edge router, comprising:
    receiving, a data packet from a sub-virtual routing and forwarding (sub-VRF) in a virtual routing and forwarding (VRF), wherein the VRF represents an Layer-3 Virtual Private Network (L3VPN), the VRF includes more than one sub-VRF, the sub-VRF comprises a plurality of user devices, the VRF is included in a network that comprises multiple VRFs, and a different Border Gateway Protocol (BGP) attribute is assigned to each sub-VRF in the VRF;
    detecting, a second value in a Border Gateway Protocol (BGP) attribute attached to the data packet, wherein the BGP attribute attached to the data packet comprises a first value and the second value, the first value identifies the network that includes the multiple VRFs, and the second value identifies that the data packet is a unicast data packet and a source sub-VRF of the data packet or a multicast data packet; and
    determining, based on the second value in the BGP attribute, whether to route the data packet to a different sub-VRF in the VRF.

2. The method of claim 1, wherein the BGP attribute is a BGP Extended Community attribute.

3. The method of claim 1, wherein whether to route the data packet to a different sub-VRF in the VRF is further determined based on an import and export policy associated with the VRF.

4. The method of claim 1, further comprising: in response to determining that the second value in the BGP attribute identifies that the data packet is originated in a sub-VRF representing resources in the VRF, routing the data packet to the different sub-VRF in the VRF.

5. The method of claim 1, further comprising: in response to determining that the second value in the BGP attribute identifies that the data packet is originated in a sub-VRF representing users that have access to other sub-VRFs in the VRF, routing the data packet to the different sub-VRF in the VRF.

6. The method of claim 1, further comprising: in response to determining that the second value in the BGP attribute identifies that the data packet is originated in a sub-VRF representing a user group, routing the data packet to a firewall.

7. An edge router, comprising:
    at least one hardware processor; and
    a non-transitory computer-readable storage medium coupled to the at least one hardware processor and storing programming instructions for execution by the at least one hardware processor, wherein the programming instructions, when executed, cause the at least one hardware processor to perform operations comprising:
    receiving, a data packet from a sub-virtual routing and forwarding (sub-VRF) in a virtual routing and forwarding (VRF), wherein the VRF represents an Layer-3 Virtual Private Network (L3VPN), the VRF includes more than one sub-VRF, the sub-VRF comprises a plurality of user devices, the VRF is included in a network that comprises multiple VRFs, and a different Border Gateway Protocol (BGP) attribute is assigned to each sub-VRF in the VRF;
    detecting, a second value in a Border Gateway Protocol (BGP) attribute attached to the data packet, wherein the BGP attribute attached to the data packet comprises a first value and the second value, the first value identifies the network that includes the multiple VRFs, and the second value identifies that the data packet is a unicast data packet and a source sub-VRF of the data packet or a multicast data packet; and
    determining, based on the second value in the BGP attribute, whether to route the data packet to a different sub-VRF in the VRF.

8. The edge router of claim 7, wherein the BGP attribute is a BGP Extended Community attribute.

9. The edge router of claim 7, wherein whether to route the data packet to a different sub-VRF in the VRF is further determined based on an import and export policy associated with the VRF.

10. The edge router of claim 7, the operations further comprising: in response to determining that the second value in the BGP attribute identifies that the data packet is originated in a sub-VRF representing resources in the VRF, routing the data packet to the different sub-VRF in the VRF.

11. The edge router of claim 7, the operations further comprising: in response to determining that the second value in the BGP attribute identifies that the data packet is originated in a sub-VRF representing users that have access to other sub-VRFs in the VRF, routing the data packet to the different sub-VRF in the VRF.

12. The edge router of claim 7, the operations further comprising: in response to determining that the second value in the BGP attribute identifies that the data packet is originated in a sub-VRF representing a user group, routing the data packet to a firewall.

13. A non-transitory computer-readable medium storing instructions which, when executed, cause a computing device to perform operations comprising:
    receiving, a data packet from a sub-virtual routing and forwarding (sub-VRF) in a virtual routing and forwarding (VRF), wherein the VRF represents an Layer-3 Virtual Private Network (L3VPN), the VRF includes more than one sub-VRF, the sub-VRF comprises a plurality of user devices, the VRF is included in a network that comprises multiple VRFs, and a different Border Gateway Protocol (BGP) attribute is assigned to each sub-VRF in the VRF;

detecting, a second value in a Border Gateway Protocol (BGP) attribute attached to the data packet, wherein the BGP attribute attached to the data packet comprises a first value and the second value, the first value identifies the network that includes the multiple VRFs, and the second value identifies that the data packet is a unicast data packet and a source sub-VRF of the data packet or a multicast data packet; and determining, based on the second value in the BGP attribute, whether to route the data packet to a different sub-VRF in the VRF.

14. The non-transitory computer-readable medium of claim 13, wherein the BGP attribute is a BGP Extended Community attribute.

15. The non-transitory computer-readable medium of claim 13, wherein whether to route the data packet to a different sub-VRF in the VRF is further determined based on an import and export policy associated with the VRF.

16. The non-transitory computer-readable medium of claim 13, the operations further comprising: in response to determining that the second value in the BGP attribute identifies that the data packet is originated in a sub-VRF representing resources in the VRF, routing the data packet to the different sub-VRF in the VRF.

17. The non-transitory computer-readable medium of claim 13, the operations further comprising: in response to determining that the second value in the BGP attribute identifies that the data packet is originated in a sub-VRF representing users that have access to other sub-VRFs in the VRF, routing the data packet to the different sub-VRF in the VRF.

* * * * *